(12) United States Patent
Yang et al.

(10) Patent No.: US 10,875,085 B2
(45) Date of Patent: Dec. 29, 2020

(54) INTELLIGENT AUTOMATIC CONICAL NET MAKING MACHINE

(71) Applicant: SHANDONG REEBOW AUTOMATION EQUIPMENT CO., LTD., Zibo (CN)

(72) Inventors: Weiguo Yang, Zibo (CN); Yang Li, Zibo (CN); Cheng Wang, Zibo (CN); Guo Zhou, Zibo (CN); Yunhai Xu, Zibo (CN); Yuyan Zhang, Zibo (CN)

(73) Assignee: SHANDONG REEBOW AUTOMATION EQUIPMENT CO., LTD., Zibo (CN)

( * ) Notice: Subject to any disclaimer, the term of this patent is extended or adjusted under 35 U.S.C. 154(b) by 177 days.

(21) Appl. No.: 16/079,493

(22) PCT Filed: Feb. 27, 2017

(86) PCT No.: PCT/CN2017/074989
§ 371 (c)(1),
(2) Date: Aug. 23, 2018

(87) PCT Pub. No.: WO2017/148347
PCT Pub. Date: Sep. 8, 2017

(65) Prior Publication Data
US 2019/0054518 A1  Feb. 21, 2019

(30) Foreign Application Priority Data

Mar. 2, 2016 (CN) ............ 2016 1 0117046
Feb. 24, 2017 (CN) ............ 2017 2 0171240

(51) Int. Cl.
*B22C 9/08* (2006.01)
*B22D 43/00* (2006.01)
(Continued)

(52) U.S. Cl.
CPC .......... *B22C 9/086* (2013.01); *B22D 43/00* (2013.01); *B29C 66/4326* (2013.01);
(Continued)

(58) Field of Classification Search
CPC ........ B22C 9/086; B22D 43/00; B22D 18/04; B29C 66/4326; B29C 66/49; B29C 66/72;
(Continued)

(56) References Cited

U.S. PATENT DOCUMENTS 1,160,816 A * 11/1915 Angell .................... B31B 50/68
                                                          227/64
1,971,962 A *  8/1934 Jones ...................... B65H 3/56
                                                         271/123
(Continued)

FOREIGN PATENT DOCUMENTS

CN  103182411   7/2013
CN  104527042   4/2015
(Continued)

OTHER PUBLICATIONS

PSA Tape Defined, Pressure Sensitive Tape Council, Sep. 4, 2011, https://www.pstc.org/i4a/pages/index.cfm?pageid=4817 (Year: 2011).*

*Primary Examiner* — Michael N Orlando
*Assistant Examiner* — Christopher W Raimund
(74) *Attorney, Agent, or Firm* — Law Offices of Steven W. Weinrieb (57) ABSTRACT

Disclosed is an intelligent automatic conical net making machine. The net making machine comprises a net winding device (3) and a net binding device (4). The net winding device (3) comprises a filter screen winding shaft (3.1), a filter screen winding drum (3.3) and a net winding power device (3.2). The filter screen winding shaft (3.1) comprises a conical hollow shaft body, and a strip-shaped net binding hole is axially provided in the hollow shaft body. The filter
(Continued)

screen winding drum (3.3) comprises two arc-shaped plates (3.5) hinged together, and the two arc-shaped plates (3.5) can be driven by the net winding power device (3.2) to be opened and closed along a hinged shaft to wrap the filter screen winding shaft (3.1) without shielding the net binding hole. The net binding device (4) comprises an automatic stapler (4.1) and a stapler base mould (4.5), and the stapler base mould (4.5) of the net binding device (4) can be inserted into the hollow shaft body of the filter screen winding shaft (3.1). The automatic stamper (4.1) can cooperate with the stapler bottom mould (4.5) through the net binding hole to complete a net binding operation. The equipment can stably and reliably finish the net supplying, feeding, winding and binding process, is smooth in equipment operation, and is suitable for popularization and industrial production in the industry.

17 Claims, 9 Drawing Sheets

(51) Int. Cl.
*B29C 65/00* (2006.01)
*B29C 53/42* (2006.01)
*B22D 18/04* (2006.01)

(52) U.S. Cl.
CPC ............. *B29C 66/49* (2013.01); *B29C 66/72* (2013.01); *B22D 18/04* (2013.01); *B29C 53/42* (2013.01); *B29C 2793/0081* (2013.01)

(58) Field of Classification Search
CPC . B29C 2793/0081; B29C 53/42; B29C 66/63; B65H 3/20; B65G 59/067; B65G 59/062
See application file for complete search history.

(56) References Cited

U.S. PATENT DOCUMENTS

| | | | | |
|---|---|---|---|---|
| 2,058,182 A | * | 10/1936 | Schmidtke | B31B 50/00 227/64 |
| 2,435,308 A | * | 2/1948 | Harvey | B31B 70/00 493/74 |
| 2,699,862 A | * | 1/1955 | Pauling | B65G 59/067 198/747 |
| 2,796,256 A | * | 6/1957 | Robertson | B65H 3/0875 271/11 |
| 3,580,564 A | * | 5/1971 | Boynton | B65H 3/20 271/33 |

FOREIGN PATENT DOCUMENTS

| | | |
|---|---|---|
| CN | 105562673 | 5/2016 |
| CN | 205393532 | 7/2016 |
| JP | 59212164 | 12/1984 |

* cited by examiner

INTELLIGENT AUTOMATIC CONICAL NET MAKING MACHINE

CROSS REFERENCE TO RELATED APPLICATIONS

This application claims priority to the following Patent Application: (1) PCT application PCT/CN2017/074989, entitled "INTELLIGENT AUTOMATIC CONICAL NET MAKING MACHINE" filed at Feb. 27, 2017; (2) Chinese patent application CN201610117046.0, filed at Mar. 2, 2016; (3) Chinese patent application CN201720171240.7, filed at Feb. 24, 2017; the above-identified applications are hereby incorporated by reference in its entirety as if fully set forth herein.

BACKGROUND

1. Technical Field

The present invention relates to the field of automation equipment, and particularly relates to an intelligent automatic conical net making machine.

2. Description of Related Art

The low pressure machine shall accurately place a filter screen at a mould inlet before casting a hub blank to filter the residue in the casting fluid. The filter screen used for casting the hub is not limited to a straight cylindrical filter screen, a conical filter screen is more commonly used, and currently, a net making machine in the prior art is only limited to the automatic manufacture of the straight cylindrical filter screen, and the conical filter screen is still rolled and processed manually. The disadvantage of manual work lies in low labor efficiency and unstable product quality, and since the material of the filter screen is made of glass fiber, it is easy to lead to allergy by skin contact, and the health of worker can be further affected if the residue of glass fiber enters the respiratory tract. In view of this, the applicant begins to research and develop the automatic equipment.

SUMMARY

The technical problem to be solved by the present invention is to provide an intelligent automatic conical net making machine, which can realize the fully automatic production of a conical filter screen reliably and stably. The second technical problem to be solved by the present invention is to be able to stick, supply and convey a filter screen piece accurately and conveniently; the third technical problem to be solved by the present invention is to realize the intelligent storage of net pieces of different sizes by modifying the structure of a stock bin, with strong adaptability; and the fourth technical problem to be solved by the present invention is that through designing a net winding device into an independent quickly-assembled module and enabling a height and an angle of the net binding device to be adjustable at the same time, when the conical nets of different specifications are manufactured, only corresponding net winding device needs to be changed correspondingly, and the position of the net binding device is adjusted, so that the specifications of manufactured products are more diverse.

In order to solve the technical problem above, the technical solution of the present invention is that: an intelligent automatic conical net making machine of the present invention comprises a net winding device and a net binding device, wherein the net winding device comprises a filter screen winding shaft, a filter screen winding drum and a net winding power device, the filter screen winding shaft comprises a conical hollow shaft body, and a strip-shaped net binding hole is axially provided in the hollow shaft body; the filter screen winding drum comprises two arc-shaped plates hinged together, and the two arc-shaped plates can be driven by the net winding power device to be opened and closed along a hinged shaft to wrap the filter screen winding shaft without shielding the net binding hole; and the net binding device comprises an automatic stapler and a stapler base mould, the stapler base mould of the net binding device can be inserted into the hollow shaft body of the filter screen winding shaft, and the automatic stamper can cooperate with the stapler bottom mould through the net binding hole to complete a net binding operation.

Preferably, an outside surface of the filter screen winding shaft is provided with a net pressing plane, and corresponding net pressing planes are arranged on the arc-shaped plates; and when the arc-shaped plate wraps the filter screen winding shaft, the two net pressing planes can cooperate to press an overlapped part of filter screen pieces.

Preferably, the intelligent automatic conical net making machine further comprises a net supplying device, wherein the net supplying device comprises a stock bin and a net taking mechanism, and the net taking mechanism can take the filter screen from the stock bin; and an upper portion of the stock bin is provided with a balancing weight, and a lower portion of the stock bin is provided with more than two stock stopping blocks.

Preferably, the net taking mechanism is located at a bottom of the stock bin; and the net taking mechanism comprises a net taking power device and a self-adhesive cloth, and the net taking mechanism can drive the self-adhesive cloth to stick the filter screen piece below the stock bin.

Preferably, the net taking mechanism comprises a net ejecting power device and a net ejecting piece, a strip-shaped hole is opened in the bottom of the stock bin, the net ejecting power device can drive the net ejecting piece to be inserted in the strip-shaped hole, so as to eject the filter screen piece.

Preferably, the intelligent automatic conical net making machine further comprises a net supplying device, wherein the net supplying device comprises a filter screen roll and a filter screen blanking mould, and the filter screen blanking mould can directly output a filter screen piece after pressing the winded filter screen.

Preferably, the intelligent automatic conical net making machine further comprises a net conveying device, wherein the net conveying device comprises a first movement power device and at least two automatic clamping jaws, the automatic clamping jaw can clamp a filter screen piece, and the movement power device can drive the automatic clamping jaw to convey the filter screen piece between the filter screen winding shaft and the filter screen winding drum.

Preferably, the net binding device further comprises a second movement power device and a stamper fixing frame, the automatic stamper and the stapler base mould are installed in the stamper fixing frame; and the second movement power device can drive the stapler base mould to be inserted in the hollow shaft body of the filter screen winding shaft.

Preferably, the intelligent automatic conical net making machine further comprises a net pushing device, wherein net pushing device comprises a net pushing power device and a net pushing block; and the net pushing block can make reciprocating motion axially along the filter screen winding shaft under the driving by the net pushing power device.

Preferably, the net pushing block is inserted in the net binding hole, and can make reciprocating motion along the net binding hole under the driving by the net pushing power device.

Preferably, the intelligent automatic conical net making machine further comprises a net supplying device, wherein the net supplying device comprises a net taking mechanism; the net taking mechanism comprises a net sticking device, the net sticking device comprises a net sticking movement power device and a net sticking support, and the net sticking movement power device can drive the net sticking support to make reciprocating motion; the net sticking support is provided with a net sticking plate, a net sticking power device, a net disassembling plate and a net disassembling power device; the net sticking power device is connected to the net sticking plate; and the net disassembling power device is connected to the net disassembling plate.

Preferably, the net sticking device further comprises an adhesive tape supplying device, the adhesive tape supplying device comprises an adhesive tape storage wheel, an adhesive tape update driving wheel, and an update driving motor, the update driving motor is connected to the adhesive tape update driving wheel and can drive the adhesive tape update driving wheel to rotate; and the unused adhesive tape is arranged on the adhesive tape update driving wheel, the adhesive tape is winded on the adhesive tape update driving wheel after releasing from the adhesive tape storage wheel, and the net sticking plate is arranged to hold the adhesive tape released between the two wheels.

The net sticking device is provided with a proximity detection switch and an adhesive tape displacement detection wheel, and the adhesive tape storage wheel can drive the adhesive tape displacement detection wheel to rotate through friction while rotating; the proximity detection switch can detect the number of turns of rotation of the adhesive tape displacement detection wheel; and the proximity detection switch can control the starting of update driving motor, and controls the stopping of the update driving motor according to the number of turns of rotation of the adhesive tape displacement detection wheel.

Preferably, the intelligent automatic conical net making machine further comprises an adhesive tape limit cylinder, wherein the adhesive tape limit cylinder can tightly hold the adhesive tape storage wheel in the net sticking process; and the adhesive tape limit cylinder can loosen the adhesive tape storage wheel when the adhesive tape is updated, so as to rotationally release the adhesive tap under the driving by the adhesive tape update driving wheel.

Preferably, the net sticking device is provided with a photoelectric detection device, and the photoelectric detection device can detect whether the net sticking of the net sticking plate is successful.

Preferably, the net taking device further comprises a synchronous belt conveyer belt device, the synchronous belt conveyer belt device comprises a conveyer belt body and a conveying positioning device; the conveying positioning device comprises front and back baffles and/or left and right baffles, and the front and back baffles are arranged at a tail end of the conveyer belt body; the left and right baffles are arranged at a side surface of the conveyer belt body; the front and back baffles are connected to front and back baffle power devices; and the left and right baffles are connected to left and right baffle power devices.

Preferably, the net supplying device further comprises a stock bin, the stock bin comprises a baseplate, a stock bin baffle and a stock bin column, the stock bin baffle is fixedly installed in the baseplate, more than one stock bin columns are provided, and the installation position of the stock bin column in the baseplate can be adjusted.

Preferably, the intelligent automatic conical net making machine further comprises the net winding device, wherein the net winding device comprises the filter screen winding shaft, the filter screen winding drum and the net winding power device; and the net winding device is designed into an integrated independent quickly-assembled module.

Preferably, the intelligent automatic conical net making machine further comprises the net binding device, wherein the net binding device is connected to a position adjusting device; and the position adjusting device can change an elevation angle and/or lifting height of the net binding device.

Preferably, the position adjusting device comprises an installation frame, a lifting screw rod, a lifting adjusting nut, a hinged bar, an angle adjusting nut and an angle adjusting screw rod, the lifting screw rod is fixed in the installation frame, the lifting adjusting nut is sleeved on the lifting screw rod, and the lifting adjusting nut is connected to the hinged bar; the net binding device is hinged to the hinged bar; and the angle adjusting nut is fixed in the installation frame, the angle adjusting screw rod is connected to a front end or a back end of the net binding device, and the angle adjusting nut is sleeved on the angle adjusting screw rod.

Compared with the prior art, the present invention has the beneficial effects as followings:

1. Two stock stopping blocks are arranged below the stock bin, the filter screen piece cannot fall off under the action of the stock stopping blocks under natural condition, and the filter screen can be removed after the self-adhesive cloth sticks the net. the balancing weight is placed in the stock bin of the filter screen, and the net sticking strength is guaranteed through adjusting the balancing weight, so that only one filter screen is stuck at a time; or, the net ejecting power device is used, which drives the net ejecting piece to be inserted into the strip-shaped hole in the bottom of the stock bin, so as to eject the filter screen piece. Upon examination, the two modes above have high accuracy in taking the net and are not easy to be failed. In addition, the filter screen piece can be directly outputted after pressing the winded filter screen by the filter screen blanking mould. Only different moulds need to be changed, and that is, the conical nets of different specifications can be processed, so that the use is more flexible and convenient.

2. The filter screen winding shaft is a conical hollow shaft, the strip-shaped net binding hole is axially opened in the hollow shaft body, and the automatic stapler can cooperate with the stapler base mould to complete the net binding operation through the net binding hole. Due to many sizes of the conical net, the filter screen winding shaft is relatively long, which can meet the required size of the conical net, and the size of the conical net can be controlled by the position of net conveying. The conicity of the filter screen winding drum is the same as that of the winding shaft, after the net winding is completed by the two winding drums, the filter screen winding drum overlaps with the net pressing plane on the filter screen winding shaft, and the two end portions of the filter screen piece are pressed and overlapped, so as to meet the requirement of net binding at later phase.

3. The positions of the automatic stapler and the stapler base mould are relatively fixed, and the stapler base mould can be extended into the filter screen winding drum. After the net winding step is completed, the second movement power device drives the automatic stapler to enter the position of the filter screen in the filter screen winding drum, so that the overlapped part of the filter screen is just between the automatic stapler and the stapler base mould, and the net binding action is completed.

4. The present invention can accurately and conveniently stick, supply and convey the filter screen piece of the conical net.

5. The present invention realizes the intelligent storage of net pieces of different sizes, with strong adaptability.

6. According to the present invention, through designing the net winding device into the independent quickly-assembled module and enabling the height and the angle of the net binding device to be adjustable, when the conical nets of different specifications are manufactured, only the net winding device needs to be changed correspondingly, and the position of the net binding device is adjusted, so that the specifications of manufactured products are more diverse.

7. The equipment can stably and reliably complete the net supplying, feeding, winding and binding process, is smooth in equipment operation, and is suitable for popularization and industrial production in the industry.

wherein:

1 refers to net supplying device: 1.1 refers to self-adhesive cloth; 1.2 refers to stock bin; 1.3 refers to net taking power device; 1.4 refers to balancing weight; 1.5 refers to filter screen guidepost; 1.6 refers to stock stopping block; 1.7 refers to net ejecting piece; 1.8 refers to stock bin baffle; 1.9 refers to stock bin column; 1.10 refers to baseplate; 1.11 refers to net sticking movement power device; 1.12 refers to adhesive tape update driving wheel; 1.13 refers to net disassembling plate; 1.14 refers to net sticking plate; 1.15 refers to adhesive tape storage wheel; 1.16 refers to adhesive tape displacement detection wheel; 1.17 refers to adhesive tape limit cylinder; 1.18 refers to conveyer belt body; 1.19 refers to left and right baffles; 1.20 refers to front and back baffles;

2 refers to net conveying device: 2.1 refers to first movement power device; 2.2 refers to automatic clamping jaw;

3 refers to net winding device: 3.1 refers to filter screen winding shaft; 3.2 refers to net winding power device; 3.3 refers to filter screen winding drum; 3.4 refers to net pressing plane; 3.5 refers to arc-shaped plate; 3.6 refers to hinged hole; 3.7 refers to hinged hole; 3.8 refers to net pressing plane;

4 refers to net binding device: 4.1 refers to automatic stapler; 4.2 refers to net binding cylinder; 4.3 refers to stamper fixing frame; 4.4 refers to second movement power device; 4.5 refers to stapler base mould;

5 refers to net pushing device: 5.1 refers to net pushing power device; 5.2 refers to net pushing block;

6 refers to filter screen piece; and

7 refers to position adjusting device: 7.1 refers to hinged bar; 7.2 refers to lifting adjusting nut; 7.3 refers to lifting screw rod; 7.4 refers to angle adjusting screw rod; 7.5 refers to angle adjusting nut; and 7.6 refers to installation frame.

DETAILED DESCRIPTION

The present invention is further described in detail below with reference to the drawings and specific embodiments.

First Embodiment

Figure 1:
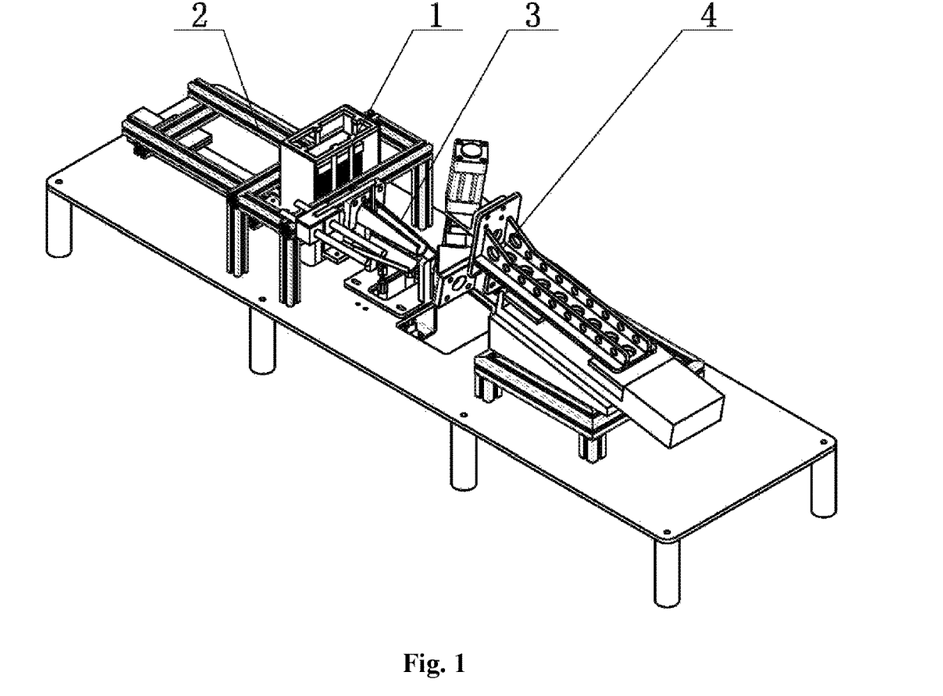
FIG. 1 is a schematic diagram illustrating a stereostructure of a first embodiment of the invention.
Figure 2:
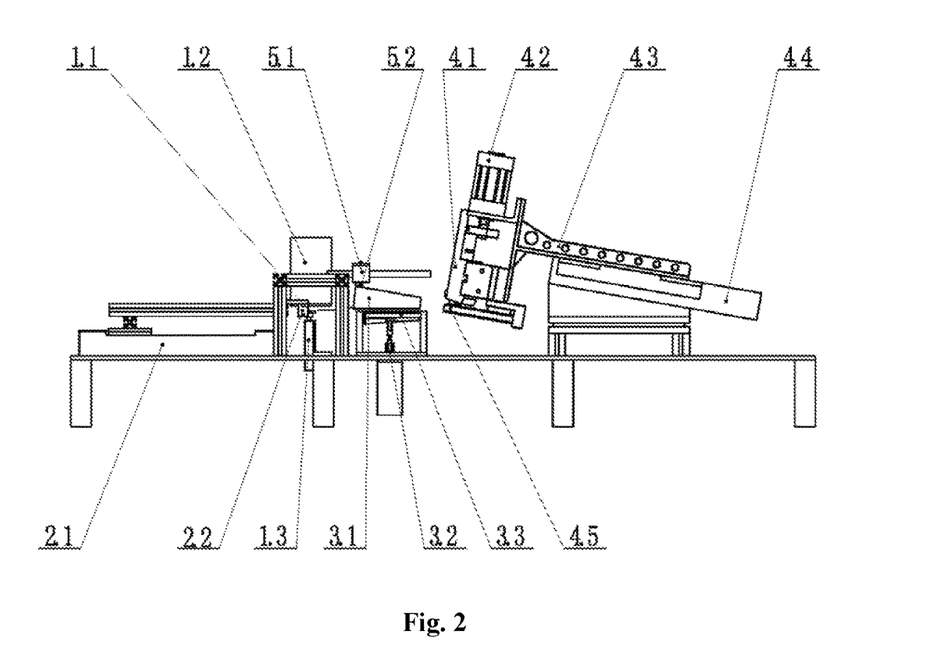
FIG. 2 is a schematic diagram illustrating a forward structure of the first embodiment of the invention.

As shown in FIGS. 1 and 2, the intelligent automatic conical net making machine of the present invention comprises a net supplying device 1, a net conveying device 2, a net winding device 3, a net binding device 4 and a net pushing device 5.

Figure 3:
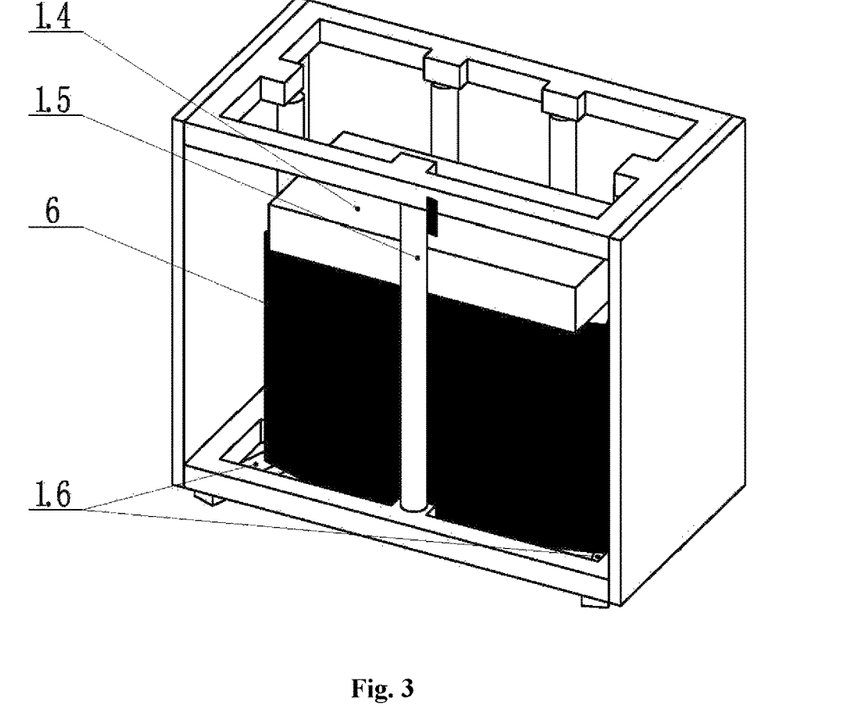
FIG. 3 is a schematic diagram illustrating a structure of a stock bin in the first embodiment.

As shown in FIGS. 2 and 3, the net supplying device 1 comprises a stock bin 1.2 and a net taking mechanism, and the net taking mechanism can take out the filter screen from the stock bin 1.2; and a side surface of the stock bin 1.2 is provided with a filter screen guidepost 1.5, an upper portion of the stock bin 1.2 is provided with a balancing weight 1.4, and a lower portion of the stock bin 1.2 is provided with more than two stock stopping blocks 1.6. The net taking mechanism is located at a bottom of the stock bin 1.2; and the net taking mechanism comprises a net taking power device 1.3 and a self-adhesive cloth 1.1, the net taking power device 1.3 can drive the self-adhesive cloth 1.1 to stick the filter screen piece 6 below the stock bin 1.2. In the embodiment, a cylinder is used as the net taking power device 1.3.

As shown in FIG. 2, the net conveying device 2 comprises a first movement power device 2.1 and at least two automatic clamping jaws 2.2, the automatic clamping jaw 2.2 can clamp a filter screen piece 6, and the movement power device can drive the automatic clamping jaw to convey the filter screen piece 6 between the filter screen winding shaft 3.1 and the filter screen winding drum 3.3. In the embodiment, an electric slide table is used in the first movement power device 2.1. The first movement power device 2.1 is a mechanism for providing reciprocating power to the automatic clamping jaw 2.2, and a cylinder, a gear rack, a nut screw and other structures can be used, which are not limited to the embodiment.

Figure 4:
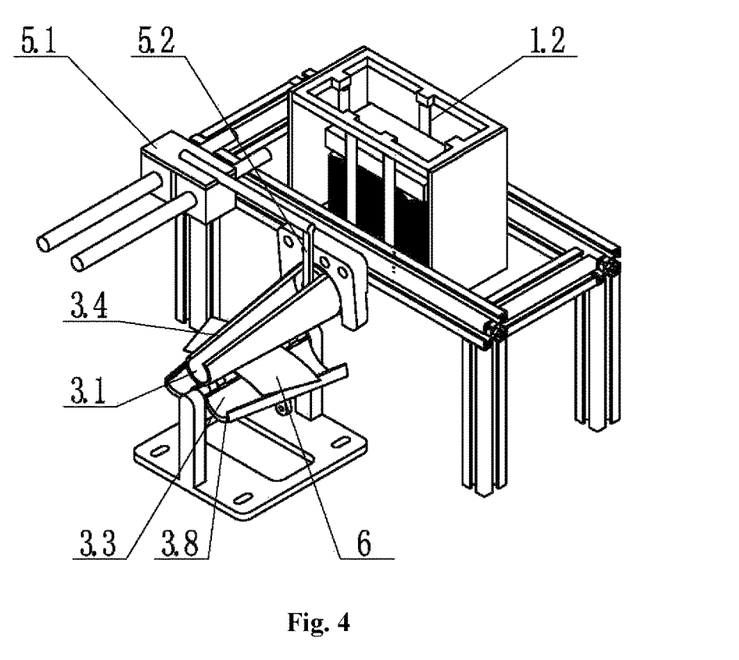
FIG. 4 is a schematic diagram illustrating a cooperation structure of a net supplying device and a net winding device in the first embodiment.
Figure 5:
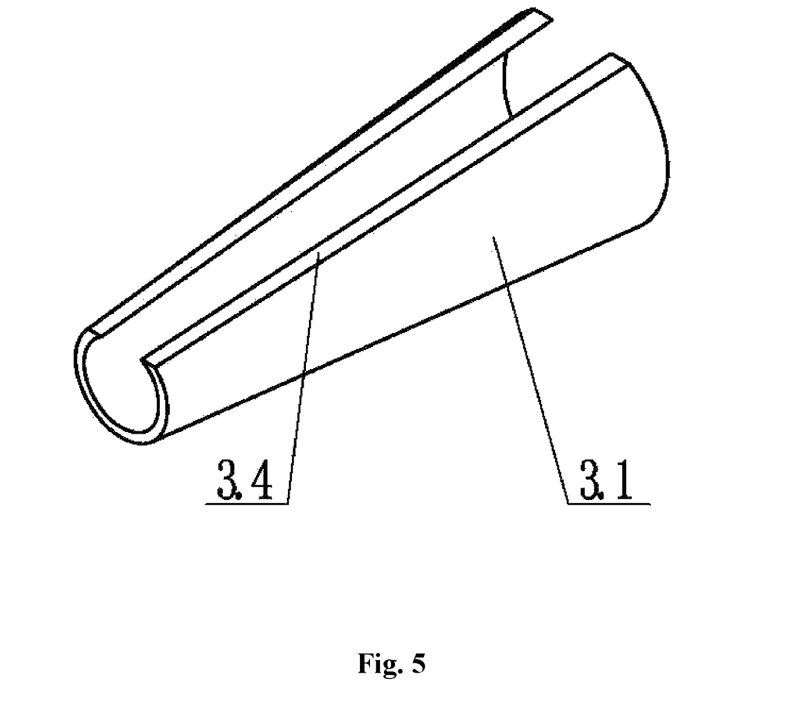
FIG. 5 is a schematic diagram illustrating a structure of a filter screen winding shaft in the first embodiment.
Figure 6:
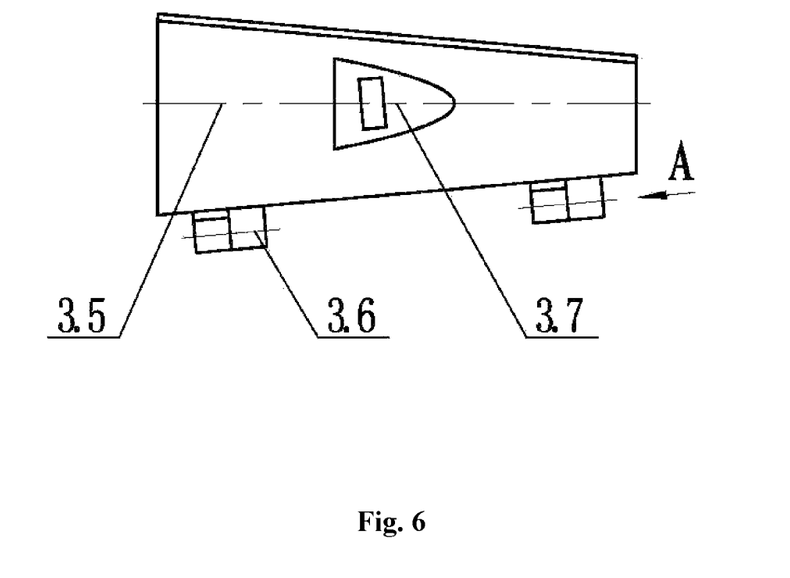
FIG. 6 is a schematic diagram illustrating a structure of a filter screen winding drum in the first embodiment.
Figure 7:
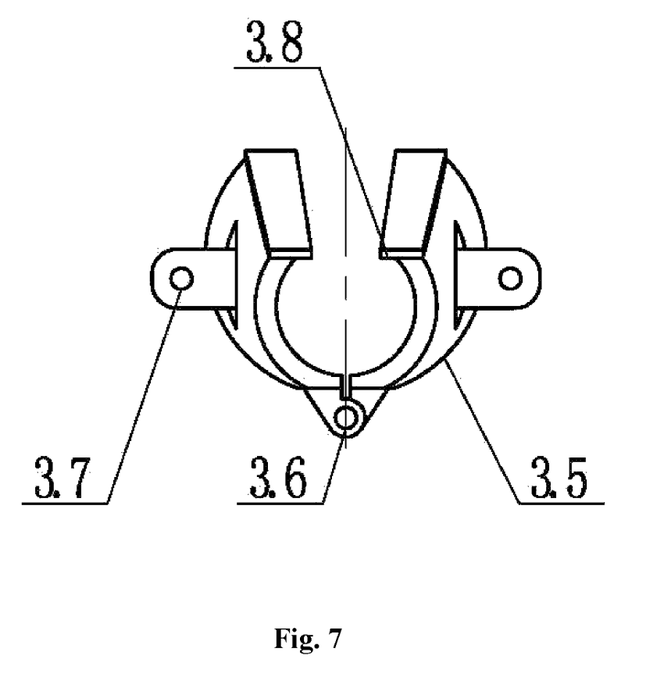
FIG. 7 is a schematic diagram illustrating a structure in A direction of FIG. 6.

As shown in FIGS. 2 and 4, the net winding device 3 comprises a filter screen winding shaft 3.1, a filter screen winding drum 3.3 and a net winding power device 3.2, the filter screen winding shaft 3.1 comprises a conical hollow shaft body, and a strip-shaped net binding hole is axially opened in the hollow shaft body; and the filter screen winding drum 3.3 comprises two arc-shaped plates 3.5 hinged together through a hinged hole 3.6, and outside surfaces of the two arc-shaped plates 3.5 are respectively connected to the net winding power device 3.2 through a hinged hole 3.7. The two arc-shaped plates 3.5 can be driven by the net winding power device 3.2 to be opened and closed along a hinged shaft to wrap the filter screen winding shaft 3.1 without shielding the net binding hole. An outside surface of the filter screen winding shaft 3.1 is provided with a net pressing plane 3.4, and corresponding net pressing planes 3.8 are arranged on the arc-shaped plates 3.5; and when the arc-shaped plate 3.5 wraps the filter screen winding shaft 3.1, the two net pressing planes can cooperate to press an overlapped part of filter screen pieces 6. In the embodiment, a cylinder is used as the net winding power device 3.2. The net winding power device 3.2 is a mechanism capable of providing power to the opening and closing of the arc-shaped plates 3.5, and the electric slide table or the gear rack, the nut screw and other structures can also be used, which are not limited by the embodiment.

Figure 8:
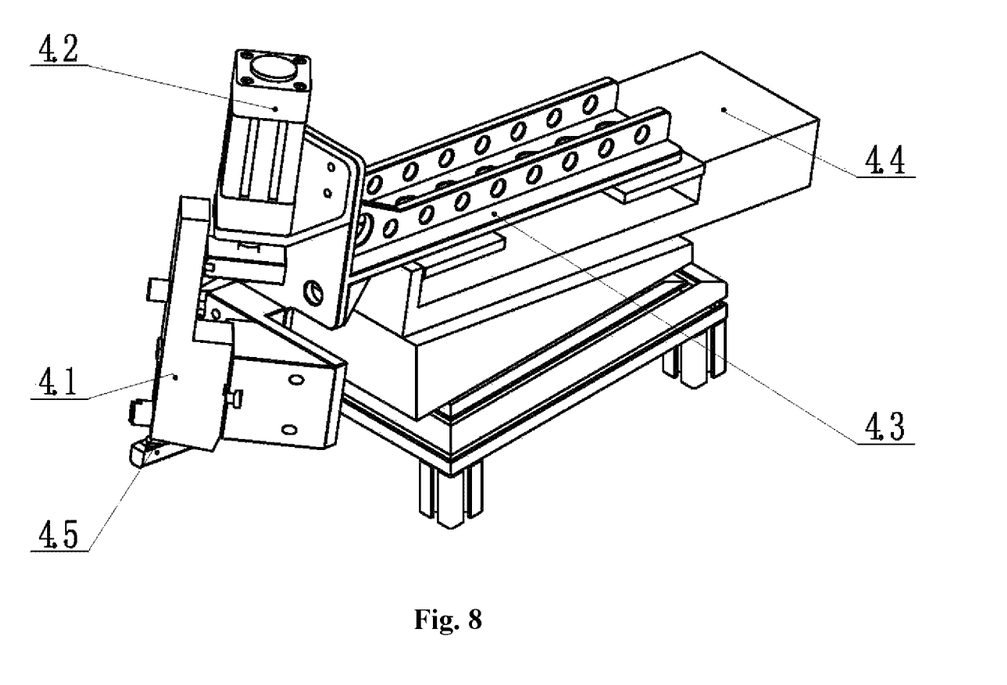
FIG. 8 is a schematic diagram illustrating a structure of a net binding device in the first embodiment.

As shown in FIGS. 2 and 8, the net binding device 4 comprises an automatic stapler 4.1, a stapler base mould 4.5, a second movement power device 4.4 and a stamper fixing frame 4.3, and the automatic stapler 4.1 and the stapler base mould 4.5 are installed in the stamper fixing frame 4.3. The automatic stapler 4.1 comprises a net binding cylinder 4.2, and the net binding cylinder 4.2 drives the automatic stapler 4.1 to complete the automatic net binding operation. The second movement power device 4.4 can drive the stapler base mould 4.5 to be inserted into the hollow shaft body of the filter screen winding shaft 3.1, and the automatic stapler 4.1 can cooperate with the stapler base mould 4.5 to complete the net binding operation through the net binding hole. In the embodiment, an electric slide table is used as the second movement power device 4.4. The second movement power device 4.4 is a mechanism for providing reciprocating motion power to the net binding device 4, and the cylinder, the gear rack, the nut screw and other structures can be used, which are not limited to the embodiment.

As shown in FIG. 2, the net pushing device 5 is further comprised, and the net pushing device 5 comprises a net pushing power device 5.1 and a net pushing block 5.2; and the net pushing block 5.2 can make reciprocating motion axially along the filter screen winding shaft 3.1 under the driving by the net pushing power device 5.1. In the embodiment, a cylinder is used as the net pushing power device 5.1. The net pushing power device 5.1 is a mechanism for providing net pushing and disassembling power to the net pushing block 5.2, and the electric slide table or the gear rack, the nut screw and other structures can also be used, which are not limited by the embodiment.

The net manufacturing process of the device is as follows:

a. Net Supplying

The cut filter screen piece 6 is loaded into the stock bin 1.2, two stock stopping blocks 1.6 are arranged at the bottom of the stock bin 1.2, the filter screen piece 6 cannot fall off automatically without external force, the balancing weight 1.4 is arranged above the filter screen pieces 6, and the filter screen piece 6 is placed neatly along the filter screen guidepost 1.5. The net taking power device 1.3 (cylinder) below the stock bin 1.2 drives the self-adhesive cloth 1.1 to stick the net, and the filter screen is removed after sticking.

b. Net Conveying

The automatic clamping jaw 2.2 clamps the two ends of the filter screen piece 6 removed, and the movement power device can drive the automatic clamping jaw 2.2 to convey the filter screen piece 6 between the filter screen winding shaft 3.1 and the filter screen winding drum 3.3.

c. Net Winding

After completing the net conveying, the automatic clamping jaw 2.2 at a side is loosened, and at the same time, the net winding power device 3.2 (cylinder) at a corresponding side drives an arc-shaped plate 3.5 of the filter screen winding drum 3.3 to complete the net winding at a side; and then the automatic clamping jaw 2.2 at the other side is loosened, and at the same time, the corresponding net winding power device 3.2 (cylinder) drives the other arc-shaped plate 3.5 of the filter screen winding drum 3.3 to complete the net winding at the other side. After completing the net winding, the filter screen pieces 6 at both sides have overlapped parts of about 10 mm. The overlapped parts of the end portions of the filter screen pieces 6 are fitted neatly under the pressure of the net pressing planes 3.4 and 3.8.

d. Net Binding

The second movement power device 4.4 can drive the stapler base mould 4.5 to be inserted into the hollow shaft body of the filter screen winding shaft 3.1, and the automatic stapler 4.1 enters the position of the filter screen in the filter screen winding drum 3.3, so that the overlapped part of the filter screen is just between the automatic stapler 4.1 and the stapler base mould 4.5, and the net binding operation is completed.

e. Net Pushing

The net pushing block 5.2 is inserted into the net binding hole in advance, and after completing the net winding step, the net pushing block 5.2 can push out the conical net along the net binding hole under the driving of the net pushing power device 5.1, so to complete the production of the conical net.

Second Embodiment

Figure 9:
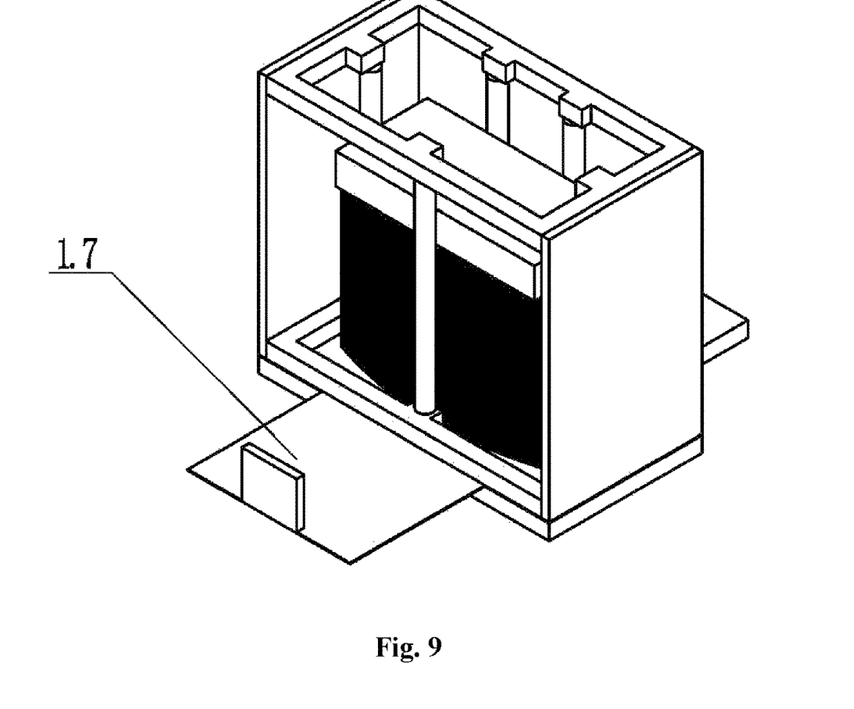
FIG. 9 is a schematic diagram illustrating a structure of a net supplying device in a second embodiment.

As shown in FIG. 9, in the embodiment, the net taking mechanism comprises a net ejecting power device and a net ejecting piece 1.7, a strip-shaped hole is opened in a bottom of a stock bin 1.2, and the net ejecting power device can drive the net ejecting piece 1.7 to be inserted into the strip-shaped hole in the bottom of the stock bin 1.2, so as to eject a filter screen piece 6.

a net pushing block 5.2 can push out the winded conical net exteriorly through a frictional force instead of being inserted into the net binding hole.

The rest structure and the mode of execution are the same as those in the first embodiment, and are not described again.

Third Embodiment

In the embodiment, the net supplying device 1 comprises a filter screen roll and a filter screen blanking mould, and the filter screen blanking mould can directly output a filter screen piece 6 after pressing the winded filter screen. The conical nets of different specifications can be processed through changing different moulds only, so that the use is more flexible and convenient.

The rest structure and the mode of execution are the same as those in the first or second embodiment, and are not described again.

Fourth Embodiment

Figure 10:
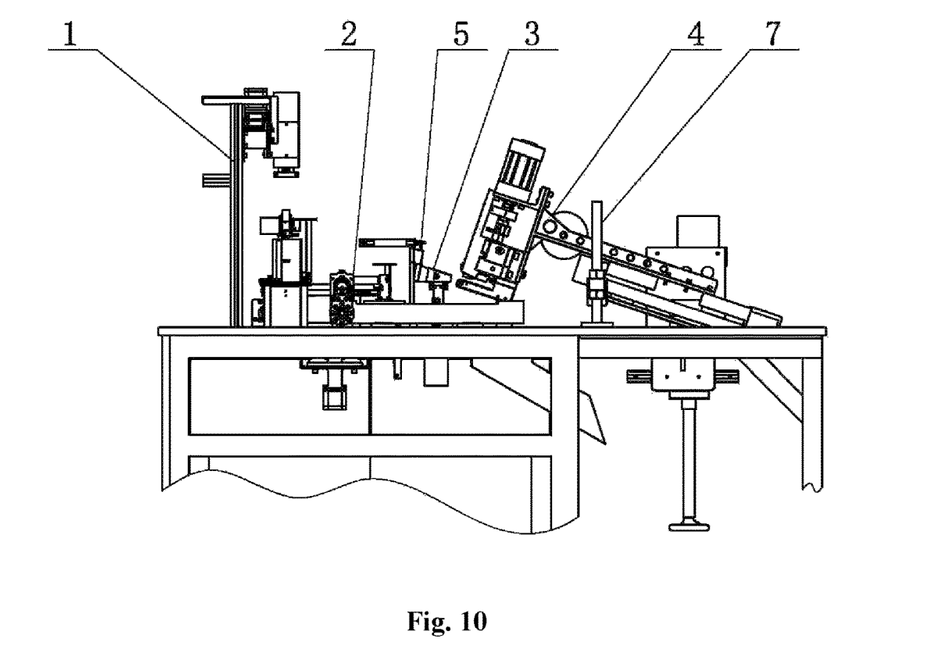
FIG. 10 is a schematic diagram illustrating a forward structure of a fourth embodiment.
Figure 11:
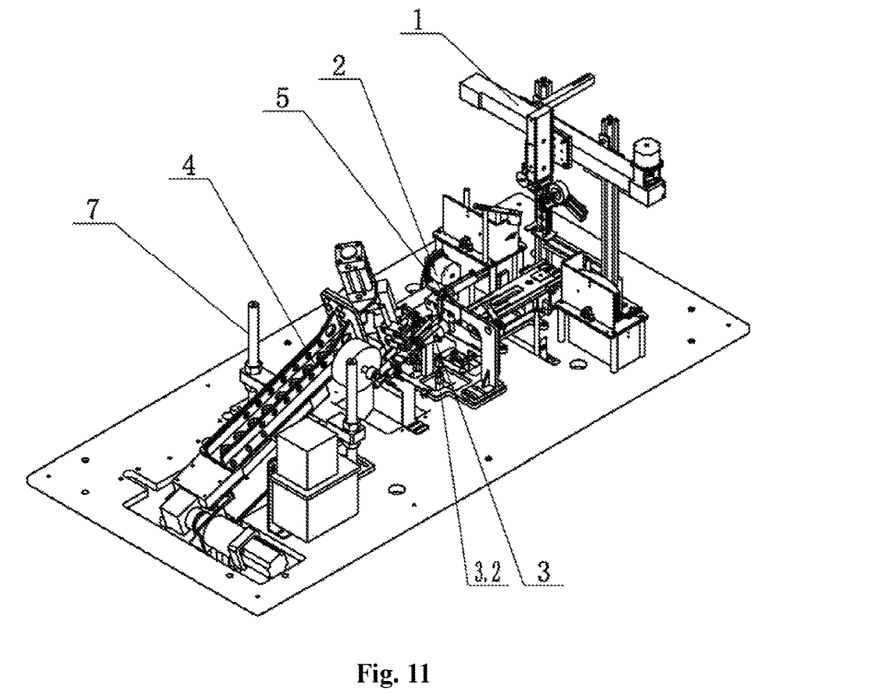
FIG. 11 is the first schematic diagram illustrating a stereostructure of the fourth embodiment.

As shown in FIGS. 10 and 11, the intelligent automatic conical net making machine described in the embodiment comprises a net supplying device 1, a net conveying device 2, a net winding device 3, a net binding device 4, a net pushing device 5 and an angle adjusting device 7.

Figure 12:
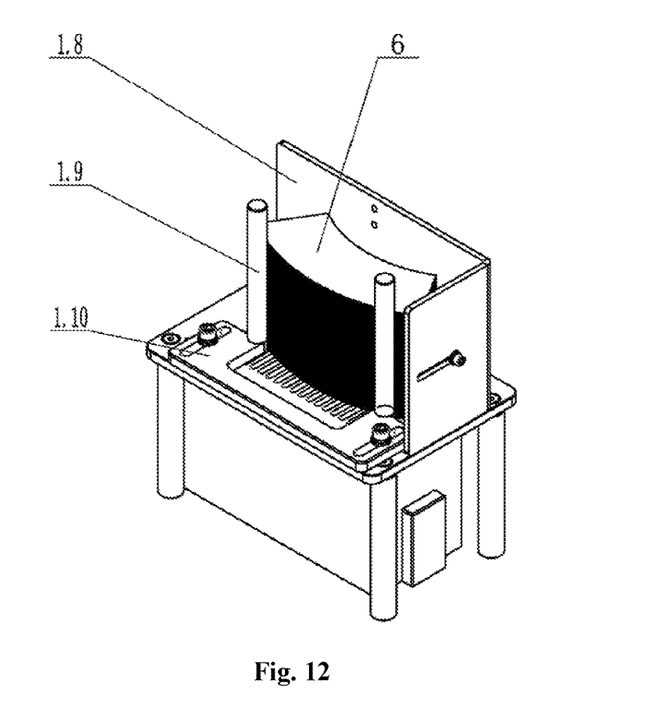
FIG. 12 is a schematic diagram illustrating a structure of the stock bin in the fourth embodiment.

The net supplying device 1 comprises a stock bin 1.2 and a net taking mechanism, and the net taking mechanism can take the filter screen from the stock bin 1.2;

As shown in FIG. 12, the stock bin comprises a baseplate 1.10, a stock bin baffle 1.91.8 and a stock bin column, the stock bin baffle 1.91.8 is fixedly installed in the baseplate 1.10, more than one stock bin columns are provided, and the installation position of the stock bin column in the baseplate 1.10 can be adjusted.

Figure 13:
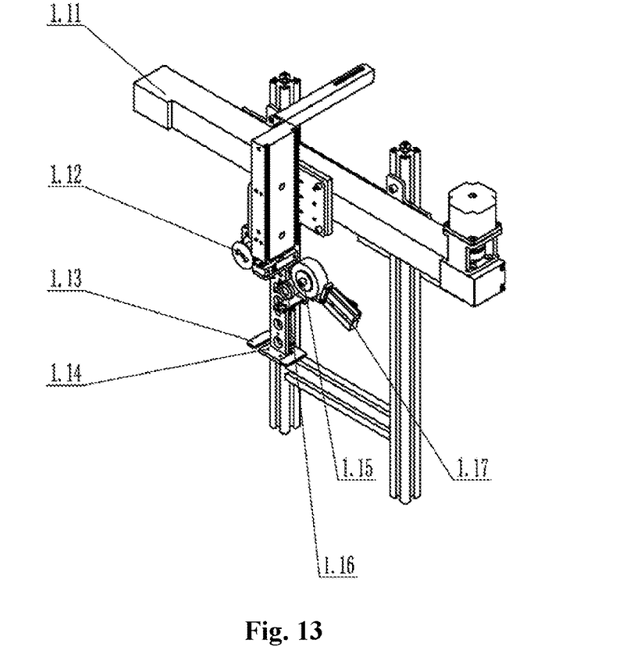
FIG. 13 is a schematic diagram illustrating a structure of the net sticking device in the fourth embodiment.
Figure 14:
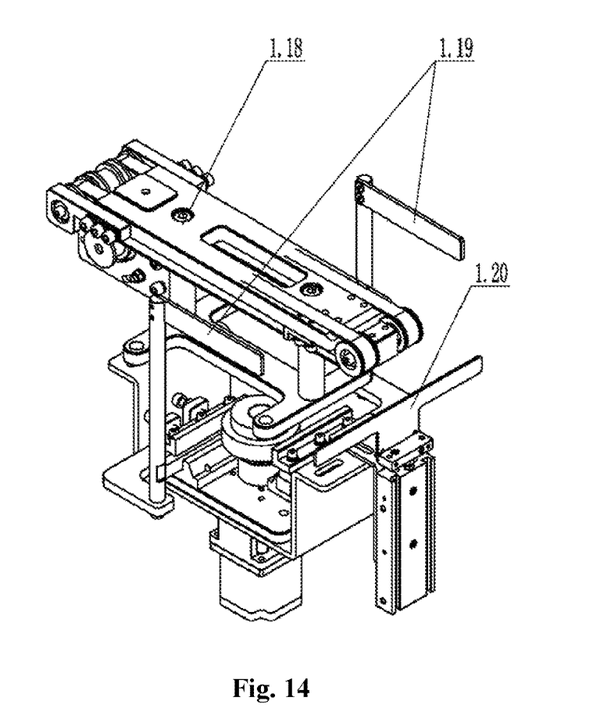
FIG. 14 is a schematic diagram illustrating a structure of a synchronous belt conveyer belt device in the fourth embodiment.

As shown in FIGS. 13 and 14, the net taking mechanism comprises a net sticking device and a synchronous belt conveyer belt device.

As shown in FIG. 13, the net sticking device comprises a net sticking movement power device 1.11 and a net sticking support, and the net sticking movement power device 1.11 can drive the net sticking support to make reciprocating motion; the net sticking support is provided with a net sticking plate 1.14, a net sticking power device, a net disassembling plate 1.13 and a net disassembling power device; the net sticking power device is connected to the net sticking plate 1.14; and the net disassembling power device is connected to the net disassembling plate 1.13. A power mechanism capable of realizing linear motion such as a cylinder or an electric sliding table can be used as the net sticking movement power device 1.11. In the embodiment, a horizontally moving slide track can be used as the net sticking movement power device 1.11. Cylinders are used as the net sticking power device and the net disassembling power device.

The net sticking device further comprises an adhesive tape supplying device, the adhesive tape supplying device comprises an adhesive tape storage wheel 1.15, an adhesive tape update driving wheel 1.12, and an update driving motor, the update driving motor is connected to the adhesive tape update driving wheel and can drive the adhesive tape update driving wheel 1.12 to rotate; and the unused adhesive tape is arranged on the adhesive tape storage wheel 1.15, the adhesive tape is winded on the adhesive tape update driving wheel 1.12 after releasing from the adhesive tape storage wheel 1.15, the net sticking plate 1.14 is arranged between the adhesive tape storage wheel 1.15 and the adhesive tape update driving wheel 1.12 to hold the adhesive tape released between the two wheels.

the net sticking device is provided with a proximity detection switch and an adhesive tape displacement detection wheel 1.16, and the adhesive tape storage wheel 1.15 can drive the adhesive tape displacement detection wheel 1.16 to rotate through friction while rotating; the proximity detection switch can detect the number of turns of rotation of the adhesive tape displacement detection wheel 1.16, that is, peripheral loops of the adhesive tape displacement detection wheel 1.16 and the adhesive tape storage wheel 1.15 maintain the same linear velocity, so as to ensure that when the adhesive tape is released by the adhesive tape storage wheel 1.15, even if an outer diameter keeps getting smaller, a length of the adhesive tape updated and outputted each time can have the preset length; and when a built-in counting program of the device detects that the number of the net sticking reaches a preset value, the viscosity of the adhesive tape decreases at the moment, the proximity detection switch can control the starting of the update driving motor, and the stopping of the update driving motor is controlled according to the number of turns of rotation of the adhesive tape displacement detection wheel 1.16.

The net sticking device further comprises an adhesive tape limit cylinder 1.17, and the adhesive tape limit cylinder 1.17 can tightly hold the adhesive tape storage wheel 1.15 during the net sticking process, so as to prevent from rotating under force; and the adhesive tape limit cylinder 1.17 can loosen the adhesive tape storage wheel 1.15 when the adhesive tape is updated, so as to rotationally release the adhesive tap under the driving by the adhesive tape update driving wheel 1.12.

The net sticking device is provided with a photoelectric detection device, and the photoelectric detection device can detect whether the net sticking of the net sticking plate 1.14 is successful.

The synchronous belt conveyer belt device comprises a conveyer belt body and a conveying positioning device; the conveying positioning device comprises front and back baffles 1.20 and/or left and right baffles 1.19, and the front and back baffles 1.20 are arranged at a tail end of the conveyer belt body; the left and right baffles 1.19 are arranged at a side surface of the conveyer belt body; the front and back baffles 1.20 are connected to front and back baffle power devices; and the left and right baffles 1.19 are connected to left and right baffle power devices. The cylinder or other power devices can be used as the front and back baffle power devices and the left and right baffle power devices, in the embodiment, the cylinders can be used as the front and back baffle power devices, and rotational power devices can be used as the left and right baffle power devices, i.e., a stepping motor, etc., and the left and right baffles 1.19 can be driven to be gradually closer to the conveyor belt body from two sides, so that the filter screen plate is gradually aligned. The number of the left and right baffles 1.19 can be symmetrically arranged along two sides of the conveyor belt body. A rotation distance of the left and right baffles 1.19 can be preset in the system according to different models of the filter screen plate.

The operation process of the net supplying device comprises two steps of net sticking and positioning conveying:

The step of net sticking is as follows: when the net needs to be taken, the net sticking power device pushes the net sticking plate 1.14 into the stock bin to stick the net, the photoelectric detection device fixed on the net sticking plate 1.14 can detect whether the net sticking is successful (the photoelectric detection device is not shown in the figure) after net sticking, and after determining that the net sticking is successful, the filter screen is sent above a synchronous conveying belt device by the horizontally moving slide track. When the net is placed, the filter screen is firstly placed on a front end of the conveyor belt body, then the net disassembling power device drives the net disassembling plate 1.13 to push down the filter screen, and the net sticking power device is lifted while pushing down, so as to complete the net disassembly.

The step of positioning conveying is as follows: when the filter screen is conveyed to the front end of the conveyor belt body, the front and back baffles 1.20 are lifted, the conveyer belt body of the filter screen is moved, when the conveyer belt body of the filter screen is moved to the front and back baffles 1.20 (photoelectric detection), the left and right baffles 1.19 are moved to the middle, and the movement distance is inputted into a program according to a size of the filter screen, so that the position of the filter screen is aligned and positioned. The front and back baffles 1.20 are dropped after positioning, and the filter screen is clamped and conveyed to the next process by the net conveying device.

Figure 15:
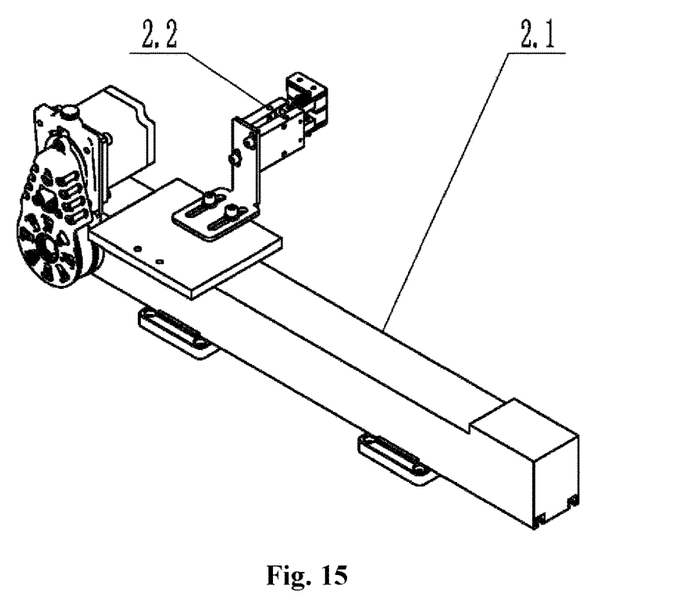
FIG. 15 is a schematic diagram illustrating a structure of the net conveying device in the fourth embodiment.

As shown in FIG. 15, the net conveying device 2 comprises a first movement power device 2.1 and an automatic clamping jaw 2.2, the automatic clamping jaw 2.2 can clamp the filter screen piece 6, and the movement power device can drive the automatic clamping jaw 2.2 to convey the filter screen piece 6 between the filter screen winding shaft 3.1 and the filter screen winding drum 3.3.

Figure 16:
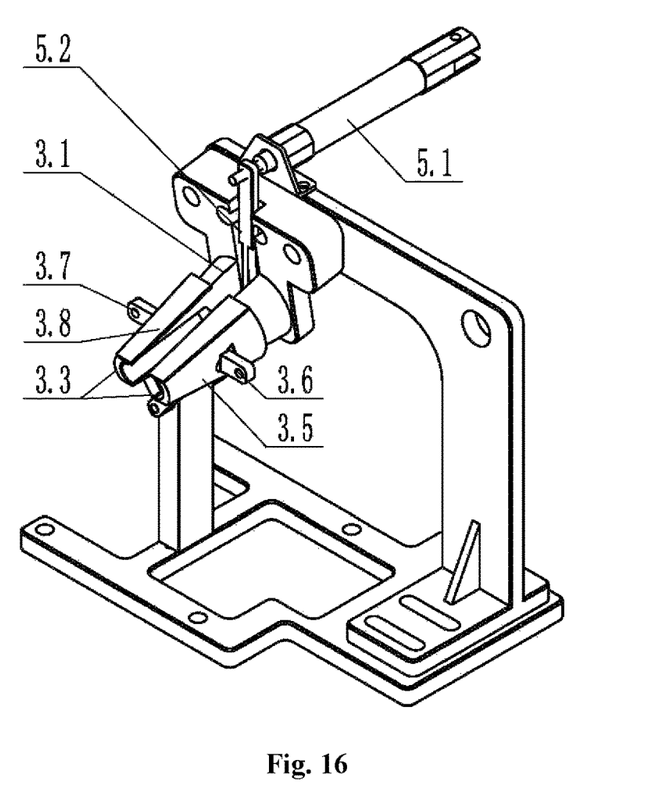
FIG. 16 is a schematic diagram illustrating a structure of the net winding device in the fourth embodiment.

As shown in FIG. 16, the net winding device 3 comprises a filter screen winding shaft 3.1, a filter screen winding drum 3.3 and a net winding power device 3.2, the filter screen winding shaft 3.1 comprises a conical hollow shaft body, and a strip-shaped net binding hole is axially opened in the hollow shaft body; and the filter screen winding drum 3.3 comprises two arc-shaped plates 3.5 hinged together through a hinged hole 3.6, and outside surfaces of the two arc-shaped plates 3.5 are respectively connected to the net winding power device 3.2 through a hinged hole 3.7. The two arc-shaped plates 3.5 can be driven by the net winding power device 3.2 to be opened and closed along a hinged shaft to wrap the filter screen winding shaft 3.1 without shielding the net binding hole. An outside surface of the filter screen winding shaft 3.1 is provided with a net pressing plane 3.4, and corresponding net pressing planes 3.8 are arranged on the arc-shaped plates 3.5; and when the arc-shaped plate 3.5 wraps the filter screen winding shaft 3.1, the two net pressing planes can cooperate to press an overlapped part of filter screen pieces 6. In the embodiment, a cylinder is used as the net winding power device 3.2. The net winding power device 3.2 is a mechanism capable of providing power to the opening and closing of the arc-shaped plates 3.5, and the electric slide table or the gear rack, the nut screw and other structures can also be used, which are not limited by the embodiment. The innovative design of the present invention lies in that the net winding device is designed into an integrated independent quickly-assembled module, so that quick change can be realized by the net winding device, and when the conical nets of different sizes need to be produced, the whole mechanism can be disassembled and replaced by the net winding device of corresponding specification.

Figure 17:
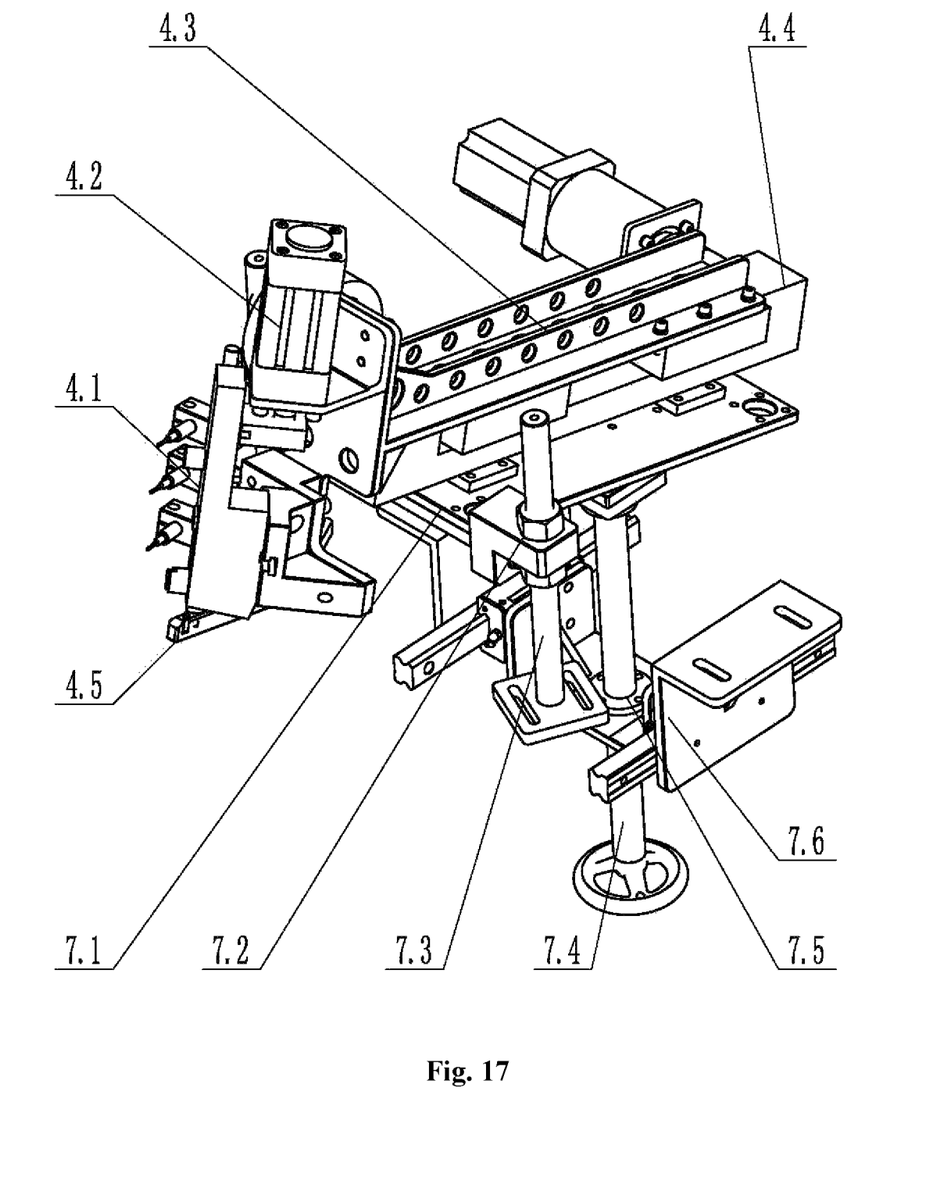
FIG. 17 is a schematic diagram illustrating structures of a net binding device and a position adjusting device in the fourth embodiment.

As shown in FIG. 17, the net binding device 4 comprises an automatic stapler 4.1, a stapler base mould 4.5, a second movement power device 4.4 and a stamper fixing frame 4.3, and the automatic stapler 4.1 and the stapler base mould 4.5 are installed in the stamper fixing frame 4.3. The automatic stapler 4.1 comprises a net binding cylinder 4.2, and the net binding cylinder 4.2 drives the automatic stapler 4.1 to complete the automatic net binding operation. The second movement power device 4.4 can drive the stapler base mould 4.5 to be inserted into the hollow shaft body of the filter screen winding shaft 3.1, and the automatic stapler 4.1 can cooperate with the stapler base mould 4.5 to complete the net binding operation through the net binding hole. In the embodiment, the electric slide table is used as the second movement power device 4.4. The second movement power device 4.4 is a mechanism for providing reciprocating motion power to the net binding device 4, and the cylinder, the gear rack, the nut screw and other structures can be used, which are not limited to the embodiment.

The net binding device is connected to the position adjusting device 7; and the position adjusting device 7 can change an elevation angle and/or lifting height of the net binding device.

The position adjusting device 7 comprises an installation frame 7.6, two lifting screw rods 7.3, two lifting adjusting nuts 7.2, an hinge bar 7.1, an angle adjusting nut 7.5 and an angle adjusting screw rod 7.4, the lifting screw rods 7.3 are fixed in the installation frames 7.6 at two sides of the net binding device, the lifting adjusting nuts 7.2 are respectively sleeved on the lifting screw rods at two sides, and the two lifting adjusting nuts 7.2 are connected together by hinge bar 7.1; the net binding device is hinged to the hinge bar 7.1; the angle adjusting nut 7.5 is fixed on the installation frame 7.6, the angle adjusting screw rod 7.4 is connected to the front end or the rear end of the net binding device, the angle adjusting nut 7.5 is sleeved on the angle adjusting screw rod 7.4, and the angle adjusting screw rod 7.4 can adjust the elevation angle of the net binding device while lifting; The height of the net binding device can be adjusted when the height positions of the lifting adjusting nut 7.2 and the angle adjusting screw rod 7.4 are adjusted at the same time.

As shown in FIGS. 10, 11 and 16, the present invention further comprises a net pushing device 5, and the net pushing device 5 comprises a net pushing power device 5.1 and a net pushing block 5.2; and the net pushing block 5.2 can make reciprocating motion axially along the filter screen winding shaft 3.1 under the driving by the net pushing power device 5.1. In the embodiment, a cylinder is used as the net pushing power device 5.1. The net pushing power device 5.1 is a mechanism for providing net pushing and disassembling power to the net pushing block 5.2, and the electric slide table or the gear rack, the nut screw and other structures can also be used, which are not limited by the embodiment.

The net manufacturing process of the device is as follows:

a. Net Supplying

The cut filter screen piece 6 is loaded into the stock bin. The net supplying device can take out the filter screen piece from the stock bin, the positioning conveying is realized.

b. Net Conveying

The automatic clamping jaw 2.2 clamps the filter screen piece 6 taken out, and the movement power device can drive the automatic clamping jaw 2.2 to convey the filter screen piece 6 between the filter screen winding shaft 3.1 and the filter screen winding drum 3.3.

c. Net Winding

After completing the net conveying, the automatic clamping jaw 2.2 at a side is loosened, and at the same time, the net winding power device 3.2 (cylinder) at a corresponding side drives an arc-shaped plate 3.5 of the filter screen winding drum 3.3 to complete the net winding at a side; and then the automatic clamping jaw 2.2 at the other side is loosened, and at the same time, the corresponding net winding power device 3.2 (cylinder) drives the other arc-shaped plate 3.5 of the filter screen winding drum 3.3 to complete the net winding at the other side. After completing the net winding, the filter screen pieces 6 at both sides have overlapping portions of about 10 mm. The overlapped parts of the end portions of the filter screen pieces 6 are fitted neatly under the pressure of the net pressing plane 3.8.

d. Net Binding

The second movement power device 4.4 can drive the stapler base mould 4.5 to be inserted into the hollow shaft body of the filter screen winding shaft 3.1, and the automatic stapler 4.1 enters the position of the filter screen in the filter screen winding drum 3.3, so that the overlapped part of the filter screen is just between the automatic stapler 4.1 and the stapler base mould 4.5, and the net binding operation is completed.

e. Net Pushing

The net pushing block 5.2 is inserted into the net binding hole in advance, and after completing the net winding step, the net pushing block 5.2 can push out the conical net along the net binding hole under the driving of the net pushing power device 5.1, so to complete the production of the conical net.

When conical nets of different specifications need to be manufactured, the position of the stock bin column needs to be adjusted, so that the filter screen pieces are neatly stacked in the stock bin with proper tightness. At the same time, the net winding device of the corresponding specification is replaced, and the elevation angle and height of the net binding device are adjusted.

The rest structure and the mode of execution are the same as those in the first, second or third embodiment, and are not described again.

The above is only preferred embodiments of the present invention, and is not intended to limit the present invention. Those skilled in the art may change or modify the technical contents above into to the equivalent embodiments with the same changes. Without departing from the contents of the technical solution of the present invention, any simple modifications, equivalent changes and modifications made to the embodiments above according to the technical substance of the present invention are still included the protection scope of the technical solution of the present invention.

The invention claimed is:

1. An intelligent automatic conical net assembling machine, comprising:
    a stock bin housing a filter screen to be formed into a net, the filter screen having a pair of oppositely disposed side edge portions;
    a net-sticking device comprising a self-adhesive cloth adapted to remove the filter screen from said stock bin as a result of said self-adhesive cloth being forced into contact with the filter screen and sticking/adhering to the filter screen;
    a powered cylinder for driving said self-adhesive cloth into contact with the filter screen such that said self-adhesive cloth sticks/adheres to the filter screen, and for removing the filter screen from said stock bin once said self-adhesive cloth has stuck/adhered to the filter screen;
    a filter screen winding shaft/mandrel about which the filter screen is to be wound so as to form the net;
    a filter screen winding drum comprising a pair of oppositely disposed arcuate plates which are adapted to operatively cooperate with said filter screen winding shaft/mandrel so as to form the filter screen into the net as a result of said pair of arcuate plates causing the pair of oppositely disposed side edge portions of the filter screen to be wound around said filter screen winding shaft/mandrel;
    a pair of clamping jaws for respectively grasping the pair of oppositely disposed side edge portions of the filter screen and for moving the filter screen into position between the filter screen winding shaft/mandrel and said pair of oppositely disposed arcuate plates of said filter screen winding drum;
    a pair of powered drive cylinders for respectively moving said pair of arcuate plates from open positions, which permit the filter screen to be interposed between said pair of arcuate plates and said filter screen winding shaft/mandrel, to closed positions such that said pair of arcuate plates operatively cooperate with said filter screen winding shaft/mandrel so as to wind the filter screen around said filter screen winding shaft/mandrel and thereby form the filter screen into the net with the oppositely disposed side edge portions of said filter screen overlapping each other; and
    a stapler for securing the overlapped side edge portions of the filter screen together so as to complete the assembly of the net.

2. The intelligent automatic conical net making machine according to claim 1, wherein:
    an outside surface of the filter screen winding shaft is provided with a net pressing plane, and corresponding net pressing planes are arranged upon said arcuately-shaped plates; and
    when said arcuately-shaped plates wrap around said filter screen winding shaft, said two net pressing planes of said arcuately-shaped plates cooperate together so as to press said overlapped edge portions of said filter screen together.

3. The intelligent automatic conical net making machine according to claim 1, wherein:
    an upper portion of said stock bin is provided with a balancing weight; and
    a lower portion of said stock bin is provided with more than two stock stopping blocks.

4. The intelligent automatic conical net making machine according to claim 3, wherein:
    said powered cylinder is located within a bottom portion of said stock bin.

5. The intelligent automatic conical net making machine according to claim 4, wherein:
    a strip-shaped hole is defined within said bottom portion of said stock bin through which said powered cylinder can drive the filter screen being removed from said stock bin.

6. The intelligent automatic conical net making machine according to claim 1, further comprising:
    a powered net pushing device comprising a powered net pushing block operatively associated with said filter screen winding shaft for expelling the assembled net from said filter screen winding shaft/mandrel and said filter screen winding drum.

7. The intelligent automatic conical net making machine according to claim 6, wherein:
    said net pushing block is inserted into one end of a net binding hole, and can undergo reciprocal movements along said net binding hole under the driving force of said powered net pushing device.

8. The intelligent automatic conical net making machine according to claim 1, wherein:
    said net sticking device comprises a net sticking powered movement device and a net sticking support, wherein said net sticking powered, movement device can drive said net sticking support through reciprocal movements; and
    said net sticking support is provided with a net sticking plate, a powered net sticking device, a net disassembling plate, and a powered net disassembling device wherein said powered net sticking device is connected to said net sticking plate, and said powered net disassembling device is connected to said net disassembling plate.

9. The intelligent automatic conical net making machine according to claim 8, wherein:

said net sticking device further comprises an adhesive tape supplying device comprising an adhesive tape storage wheel, an adhesive tape uptake driving wheel, and an uptake driving motor;

said uptake driving motor is connected to said adhesive tape uptake driving wheel and can rotatably drive said adhesive tape uptake driving wheel;

unused adhesive tape is disposed upon an adhesive tape storage wheel;

adhesive tape is wound upon said adhesive tape uptake driving wheel after being released from said adhesive tape storage wheel; and said net sticking plate is disposed between said adhesive tape storage wheel and said adhesive tape uptake driving wheel so as to hold the released adhesive tape between said two adhesive tape storage and adhesive tape uptake driving wheels.

10. The intelligent automatic conical net making machine according to claim 9, wherein:

said net sticking device is provided with a proximity detection switch and an adhesive tape displacement detection wheel;

said adhesive tape storage wheel can rotate said adhesive tape displacement detection wheel;

said proximity detection switch can detect the number of rotations of said adhesive tape displacement detection wheel; and said proximity detection switch can control the starting and stopping of said uptake driving motor depending upon the number of rotations of said adhesive tape displacement detection wheel.

11. The intelligent automatic conical net making machine according to claim 9, further comprising:

an adhesive tape limit cylinder for tightly holding said adhesive tape storage wheel during the net sticking process, and for releasing said adhesive tape storage wheel when said adhesive tape uptake driving wheel is being rotated so as to permit said adhesive tape uptake driving wheel to take up said adhesive tape.

12. The intelligent automatic conical net making machine according to claim 9, wherein:

said net sticking device is provided with a photoelectric detection device for detecting whether the net sticking of said net sticking plate has been successful.

13. The intelligent automatic conical net making machine according to claim 1, further comprising:

a synchronous conveyer belt comprising a conveyer belt body and a conveying positioning device;

wherein said conveying positioning device comprises front and back baffles, and/or left and right baffles, wherein the front and back baffles are disposed at a tail end of said conveyer belt body, said left and right baffles are along side surfaces of said conveyer belt body, said front and back baffles are connected to front and back baffle powered actuators, and said left and right baffles are connected to left and right baffle powered actuators.

14. The intelligent automatic conical net making machine according to claim 1, wherein:

said stock bin comprises a baseplate, a stock bin baffle fixedly installed within said baseplate, and a plurality of stock bin columns mounted within said baseplate, wherein the dispositions of said plurality of stock bin columns within said baseplate can be adjusted.

15. The intelligent automatic conical net making machine according to claim 1, wherein:

said filter screen winding shaft, said filter screen winding drum, and said pair of powered drive cylinders comprise an integrated independent quickly-assembled module.

16. The intelligent automatic conical net making machine according to claim 1, wherein:

said stapler is operatively connected to a position adjusting device for changing an elevational angle and/or elevational height of said stapler.

17. The intelligent automatic conical net making machine according to claim 16, wherein:

said position adjusting device comprises an installation frame, a lifting screw rod, a lifting adjusting nut, a hinged bar, an angle adjusting nut and an angle adjusting screw rod; and wherein said lifting screw rod is fixed upon said installation frame, said lifting adjusting nut is sleeved upon said lifting screw rod, said lifting adjusting nut is connected to said hinged bar, said stapler is hingedly connected to said hinged bar, said angle adjusting nut is fixed upon said installation frame, said angle adjusting screw rod is connected to a front end or a back end of said stapler, and said angle adjusting nut is sleeved on said angle adjusting screw rod.

* * * * *